United States Patent
Lee et al.

(10) Patent No.: US 11,292,165 B2
(45) Date of Patent: Apr. 5, 2022

(54) METHOD FOR SELECTING MATERIAL OF INJECTION-MOLDED ARTICLE AND METHOD FOR MANUFACTURING INJECTION-MOLDED ARTICLE

(71) Applicant: LG CHEM, LTD, Seoul (KR)

(72) Inventors: Hyun Sup Lee, Daejeon (KR); Soon Ho Sun, Daejeon (KR); Yi Young Choi, Daejeon (KR); Ki Soo Lee, Daejeon (KR); Bog Ki Hong, Daejeon (KR); Sung Hyun Park, Daejeon (KR); Myung Han Lee, Daejeon (KR); Chang Kwon Chung, Daejeon (KR)

(73) Assignee: LG CHEM, LTD., Seoul (KR)

( * ) Notice: Subject to any disclaimer, the term of this patent is extended or adjusted under 35 U.S.C. 154(b) by 206 days.

(21) Appl. No.: 16/610,731

(22) PCT Filed: Sep. 29, 2017

(86) PCT No.: PCT/KR2017/011046
§ 371 (c)(1),
(2) Date: Apr. 30, 2020

(87) PCT Pub. No.: WO2019/066112
PCT Pub. Date: Apr. 4, 2019

(65) Prior Publication Data
US 2020/0282609 A1 Sep. 10, 2020

(51) Int. Cl.
*B29C 45/00* (2006.01)
*B29C 45/76* (2006.01)
*B29L 31/40* (2006.01)

(52) U.S. Cl.
CPC .......... *B29C 45/0001* (2013.01); *B29C 45/76* (2013.01); *B29C 2945/76003* (2013.01); *B29C 2945/7629* (2013.01); *B29K 2023/06* (2013.01); *B29L 2031/40* (2013.01)

(58) Field of Classification Search
CPC . B29C 45/0001; B29C 45/0003; B29C 45/76; B29C 63/02; B29C 63/40; B29C 31/006; B29C 31/008; B29C 31/04; B29C 33/52; B29C 43/361; B29C 45/0062; B29C 45/16; B29C 45/18; B29C 45/561
See application file for complete search history.

(56) References Cited

FOREIGN PATENT DOCUMENTS

| EP | 1846491 B1 | 12/2009 |
|---|---|---|
| EP | 3115175 A1 | 1/2017 |
| JP | 11-240023 A | 9/1999 |
| JP | 2002037897 A | 2/2002 |
| JP | 2005169841 A | 6/2005 |
| JP | 2008-528789 A | 7/2008 |
| JP | 2009-235309 A | 10/2009 |
| JP | 1020130027320 A | 3/2013 |
| JP | 2013-241588 A | 12/2013 |

(Continued)

OTHER PUBLICATIONS

XP55641222: Lyondellbasell, "A Guide to Polyolefin Injection Mold," Jul. 26, 2015, pp. 1-49.

*Primary Examiner* — Stella K Yi
(74) *Attorney, Agent, or Firm* — Dentons US LLP

(57) ABSTRACT

The present application relates to a method for selecting an injection-molded article and a method for manufacturing an injection-molded article. An injection-molded article having excellent crack stability can be produced using the material selected using the described selection method without having to manufacture test articles through injection molding.

15 Claims, 1 Drawing Sheet

(56) References Cited

FOREIGN PATENT DOCUMENTS

| | | |
|---|---|---|
| KR | 1020010043690 A | 5/2001 |
| KR | 100459304 B1 | 11/2004 |
| KR | 1020090073567 A | 7/2009 |
| KR | 1020150038416 A | 4/2015 |
| KR | 101638240 B1 | 7/2016 |
| KR | 101746692 B1 | 6/2017 |
| WO | 2013178241 A1 | 12/2013 |

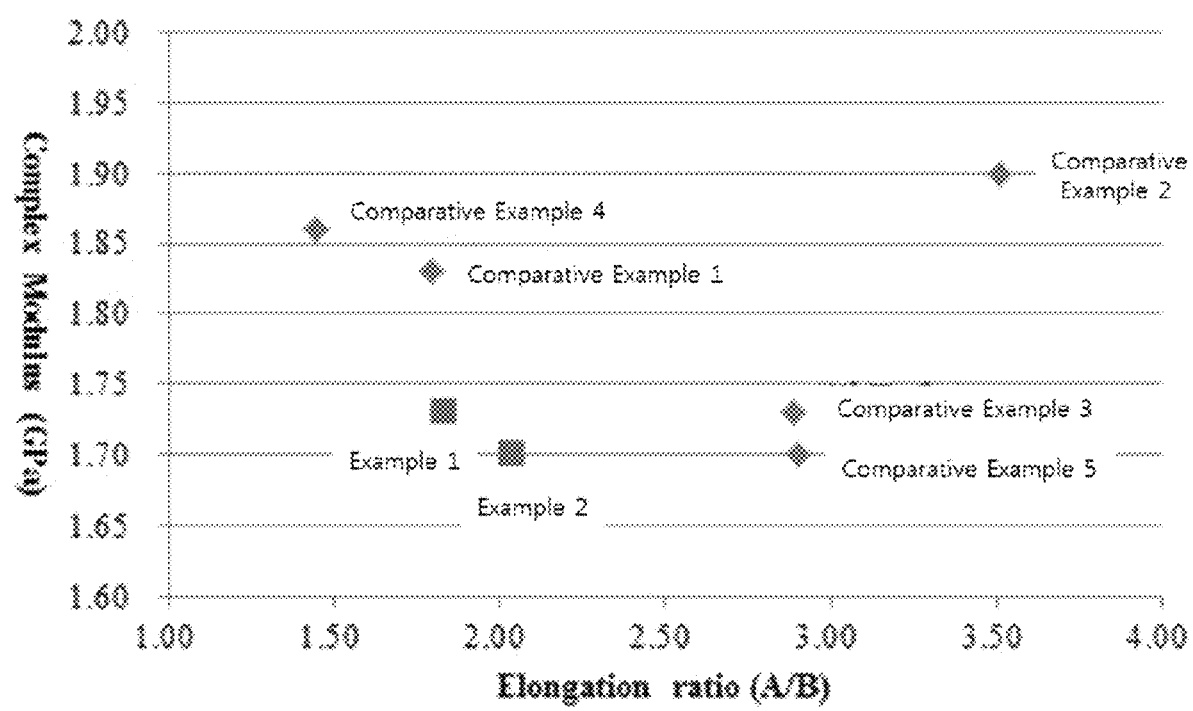

METHOD FOR SELECTING MATERIAL OF INJECTION-MOLDED ARTICLE AND METHOD FOR MANUFACTURING INJECTION-MOLDED ARTICLE

CROSS-REFERENCE TO RELATED APPLICATIONS

This application is the U.S. national stage of international application No. PCT/KR2017/011046, filed on Sep. 29, 2017, the disclosure of which is incorporated herein in its entirety.

TECHNICAL FIELD

The present application relates to a method for selecting a material of an injection-molded article and a method for manufacturing an injection-molded article.

BACKGROUND ART

Products made by injection molding of polyethylene may crack during use. Therefore, when a product is produced by injection molding, polyethylene should be selected, which is capable of producing an injection-molded article having excellent crack stability. However, the conventional method for selecting a material used for injection molding has a problem that the crack stability of an injection-molded article cannot be known unless an injection-molded article is manufactured by injection molding.

PRIOR ART DOCUMENTS

Patent Document 1: Korean Patent No. 1638240

DISCLOSURE

Technical Problem

The present application provides a method for selecting a material of an injection-molded article and a method for manufacturing an injection-molded article.

Technical Solution

The present application relates to a method for selecting a material of an injection-molded article. According to the method for selecting a material of an injection-molded article of the present application, it is possible to select polyethylene which can produce an injection-molded article having excellent crack stability through simple physical property evaluation of polyethylene used for injection molding, and to manufacture an injection-molded article using the polyethylene which can produce an injection-molded product having excellent crack stability.

The method for selecting a material of an injection-molded article of the present invention is a method for selecting a material having a complex modulus within a specific range.

The complex modulus is measured from a first specimen produced in the form of a sheet having a width of 6 mm, a height of 10 mm and a thickness of 0.3 mm from polyethylene. It will be understood by those skilled in the art that there may be errors, which are acceptable in the art, in describing the lengths and thickness, and the like of the specimen used in the measurement of the physical properties in detail herein. In the specimen manufacturing process, the error may be about 1% to 5% or so. The first specimen can be prepared by dissolving polyethylene pellets at 150° C. to 250° C. and applying the dissolved pellets to a pressing process at a molding pressure of 20 to 25 MPa. If the complex modulus is measured from the first specimen that is molded under the above conditions and produced, a material having excellent crack stability can be selected when the injection is performed under injection conditions of the method for manufacturing an injection-molded article to be described below.

The measurement of the complex modulus can be performed by applying a displacement of 0.1% at a frequency of 1 Hz to the first specimen in the longitudinal direction of the first specimen at 25° C. The displacement is calculated by (length after applying tensile strain−length before applying tensile strain)/(length before applying tensile strain)×100. If the complex modulus is measured under the above conditions, it is possible to select a material capable of producing an injection-molded article having excellent crack stability when the injection is performed under injection conditions of the method for manufacturing an injection-molded article to be described below.

The crack stability of the injection-molded article produced through injection molding is related to stiffness of the injection-molded article. The stiffness of the injection-molded article can be deduced from the complex modulus of the material. Particularly, when a crucible is manufactured by injection molding, the crack stability of the bottom surface of the crucible can be deduced from the complex modulus of the material. The material capable of producing an injection-molded article having excellent crack stability can have a complex modulus measured in the form of the first specimen described above in a range of 1.80 GPa or less, or 1.75 GPa or less. The smaller the value of the complex modulus means the greater the stiffness of the injection-molded article, but if the complex modulus is too small, processability of the material deteriorates and efficiency of the injection process deteriorates, and thus it is preferred that the complex modulus measured in the form of the first specimen is 1.3 GPa or more, 1.4 GPa or more, or 1.45 GPa or more. When a material having a complex modulus in the above-mentioned range is used, an injection-molded article having excellent stiffness can be produced by an efficient process.

The material selection method of the injection-molded article of the present invention is a method for selecting a material having an elongation ratio in a specific range. The elongation ratio of the present invention means a ratio (A/B) of elongation in the transverse direction (A) and elongation in the longitudinal direction (B). The transverse direction in the elongation means the same direction as the injection direction in which a second specimen is produced, and the longitudinal direction in the elongation means a direction perpendicular to the injection direction.

A second specimen in the form of a dog bone having a thickness of 3 mm, a width of 3 mm and an elongation part length of 13 mm is prepared, from which the elongation ratio is confirmed. The second specimen can be produced by an injection molding method with a resin temperature of 190° C. to 250° C., a mold temperature of 40° C. to 60° C. and a molding pressure of 0.6 MPa to 1.2 MPa. If the elongation ratio is measured from the second specimen prepared by injection under the above conditions, a material having excellent crack stability can be selected when the injection is performed under the injection conditions of the method for manufacturing an injection-molded article to be described below.

Determination of the elongation ratio (A/B) is performed by measuring elongation (A) in the transverse direction and elongation (B) in the longitudinal direction of the second specimen at 25° C. The elongation means a value obtained by elongating the specimen to the breaking point and dividing an additional length of the specimen elongated to the breaking point and thus additionally elongated to the elongation direction by a length in the elongation direction before elongation. Specifically, it is calculated by (length after elongation−length before elongation)/(length before elongation). The elongation (A) in the transverse direction can be measured by elongating the second specimen in the transverse direction at an elongation speed of 300 mm/min at 25° C. The elongation (B) in the longitudinal direction can be measured by elongating the second specimen in the longitudinal direction at an elongation speed of 300 mm/min at 25° C. When the elongation ratio is determined under the above-described conditions, a material capable of producing an injection-molded article having excellent crack stability can be selected when the injection is performed under the injection conditions of the method for manufacturing an injection-molded article to be described below.

The crack stability of the injection-molded article produced through injection molding is related to orientation of the injection-molded article. The orientation of the injection-molded article can be deduced from the elongation ratio of the material. Particularly, when the crucible is manufactured by injection molding, the crack stability of the side surface of the crucible can be deduced from the elongation ratio of the material. The material capable of producing an injection-molded article having excellent crack stability may have an elongation ratio (A/B) as determined in the form of the above-mentioned second specimen in a range of 2.8 or less, 2.5 or less, or 2.2 or less. The smaller the range of the elongation ratio is, the smaller the orientation in the transverse direction is and the stiffness in the longitudinal direction is increased, so that a probability of occurrence of cracks parallel to the transverse direction is reduced. However, when the range of the elongation ratio is too small, there is a problem that productivity is lowered when the injection-molded article is produced through injection, and thus it is preferred that the range of the elongation ratio determined in the form of the above-mentioned second specimen is 1.5 or more, 1.6 or more, or 1.7 or more. Values of the elongation (A) in the transverse direction and the elongation (B) in the transverse direction are not particularly limited as long as the elongation ratio (A/B) satisfies the above value, but it is preferred that the elongation (A) in the transverse direction is 1.8 to 2.5 and the elongation in the longitudinal direction is 1.25 to 1.45.

The present invention also relates to a method for manufacturing an injection-molded article with polyethylene which is capable of producing an injection-molded article having excellent crack stability.

The method for manufacturing an injection-molded article of the present invention is a method for manufacturing an injection-molded article with polyethylene having a complex modulus and an elongation ratio in specific ranges.

In the method for manufacturing an injection-molded article of the present invention, the manufacturing method of the first specimen relating to the complex modulus, the method of measuring the complex modulus and the preferred range of the complex modulus are as described above and will be omitted.

In the method for manufacturing an injection-molded article of the present invention, the method for manufacturing the second specimen relating to the elongation ratio, the method of determining the elongation ratio, the preferred elongation ratio and the preferred range of elongation are as described above and will be omitted.

The injection molding method of the present invention may be an injection molding with a resin temperature of 190° C. to 250° C., a mold temperature of 40° C. to 60° C. and a molding pressure of 0.6 MPa to 1.2 MPa. When the injection molding is performed under the above conditions, an injection-molded article having excellent crack stability can be manufactured with polyethylene satisfying the range of the complex modulus and the range of the elongation ratio as described above, and the injection molding can be efficiently performed.

Advantageous Effects

According to the method for selecting a material of an injection-molded article and the method for manufacturing an injection-molded article of the present application, a material capable of producing an injection-molded article having excellent crack stability can be selected and an injection-molded article having excellent crack stability can be produced.

BRIEF DESCRIPTION OF DRAWINGS

The FIGURE is a view showing results of measuring complex moduli and ratios of elongation in the transverse direction to elongation in the longitudinal direction in Examples and Comparative Examples of the present invention.

MODE FOR INVENTION

Hereinafter, the present application will be described in more detail by way of examples according to the present application and comparative examples that do not comply with the present application, but the scope of the present application is not limited by the examples as set forth below.

In order to evaluate crack stability of injection-molded articles made of seven types of polyethylene, the complex modulus and the ratio of elongation in the transverse direction and elongation in the longitudinal direction were measured from polyethylene as follows.

1. Measurement of Complex Modulus

Polyethylene pellets were dissolved at 200° C. and the dissolved polyethylene pellets were applied to a pressing process at a molding pressure of 20 to 25 MPa to prepare a specimen in the form of a sheet having a width of 6 mm, a height of 10 mm and a thickness of 0.3 mm.

The complex modulus was measured by applying a displacement of 0.1% at a frequency of 1 Hz to the specimen at 25° C. using Q800, a dynamic mechanical analyzer (DMA) from TA instruments. The measurement results were shown in Table 1 below.

2. Determination of Ratio of Elongation in the Transverse Direction to Elongation in the Longitudinal Direction Polyethylene was injection-molded by an injection molding method with a resin temperature of about 230° C., a mold temperature of about 50° C. and a molding pressure of about 0.9 to 1.0 MPa to prepare a specimen in the form of a dog bone having a thickness of 3 mm, a width of 3 mm, and an elongation part length of 13 mm.

Using a universal testing machine (UTM), the specimen was elongated to the breaking point in the transverse direction and the longitudinal direction at an elongation speed of 300 mm/min at 25° C., and elongation in the transverse direction and elongation in the longitudinal direction (B) were measured. The measurement results were shown in Table 1 below.

3. Crack Stability Test

Polyethylene was injection-molded by an injection molding method with a resin temperature of about 230° C., a mold temperature of about 50° C. and a molding pressure of about 0.9 to 1.0 MPa to manufacture a crucible having a top surface diameter of 30 cm, a bottom surface diameter of 27 cm and a height of 36 cm.

The crucible manufactured by injection molding was filled with water and treated with a lid so as to prevent water from leaking during a drop process, and then, it was observed whether or not cracks were generated on the bottom surface and side surface of the crucible by dropping the crucible 10 times from a 2M height to the bottom surface and the side surface, respectively. Observation results were shown in Table 1 below, where notation criteria are as follows.

O: cracks were found on both side and bottom surfaces of crucible.

X: cracks were not found on the side surface or the bottom surface of crucible.

TABLE 1

|  |  |  | Elongation | Elongation ratio | Complex modulus (GPa) | Crack occurrence | Yield strength (MPa) | Bending elastic modulus (MPa) |
|---|---|---|---|---|---|---|---|---|
| Example | 1 | Transverse direction | 1.345 | 1.84 | 1.73 | X | 24.8 | 932-1030 |
|  |  | Longitudinal direction | 2.47 |  |  |  | 25.8 |  |
|  | 2 | Transverse direction | 1.435 | 2.04 | 1.70 | X | 24.8 |  |
|  |  | Longitudinal direction | 2.93 |  |  |  | 26.4 |  |
| Comparative Example | 1 | Transverse direction | 1.37 | 1.80 | 1.83 | O | 25.3 |  |
|  |  | Longitudinal direction | 2.47 |  |  |  | 27.0 |  |
|  | 2 | Transverse direction | 0.56 | 3.51 | 1.9 | O | 23.3 |  |
|  |  | Longitudinal direction | 1.963 |  |  |  | 26.2 |  |
|  | 3 | Transverse direction | 0.536 | 2.89 | 1.73 | O | 23.6 |  |
|  |  | Longitudinal direction | 1.549 |  |  |  | 26.3 |  |
|  | 4 | Transverse direction | 0.514 | 1.45 | 1.86 | O | 25.4 |  |
|  |  | Longitudinal direction | 0.743 |  |  |  | 27.1 |  |
|  | 5 | Transverse direction | 0.603 | 2.91 | 1.70 | O | 23.5 |  |
|  |  | Longitudinal direction | 1.753 |  |  |  | 24.9 |  |

The invention claimed is:

1. A method for selecting a material of an injection-molded article, the method comprising:
preparing a first specimen, which is a polyethylene sheet having a width of 6 mm, a height of 10 mm and a thickness of 0.3 mm;
preparing a second specimen by injection-molding polyethylene in a form of a dog bone having a thickness of 3 mm, a width of 3 mm and an elongation part length of 13 mm;
measuring a complex modulus of the first specimen at 25° C.;
measuring elongation (A) in a transverse direction of the second specimen and elongation (B) in a longitudinal direction of the second specimen at 25° C. to determine an elongation ratio (A/B); and
selecting a polyethylene having the complex modulus of 1.80 GPa or less and the elongation ratio (A/B) of 2.8 or less as a selected polyethylene for injection molding.

2. The method for selecting a material of an injection-molded article according to claim 1, wherein the first specimen is prepared by dissolving polyethylene pellets at 1500 C to 250° C. and subjecting the dissolved polyethylene pellets to a pressing process at a molding pressure of 20 to 25 MPa.

3. The method for selecting a material of an injection-molded article according to claim 1, wherein the complex modulus of the first specimen is measured by applying a displacement of 0.1% at a frequency of 1 Hz to the first specimen in a longitudinal direction of the first specimen at 25° C.

4. The method for selecting a material of an injection-molded article according to claim 1, wherein the second specimen is prepared by an injection molding method with a resin temperature of 190° C. to 250° C., a mold temperature of 40° C. to 60° C. and a molding pressure of 0.6 MPa to 1.2 MPa.

5. The method for selecting a material of an injection-molded article according to claim 1, wherein the elongation ratio (A/B) of the second specimen is calculated by measuring the elongation (A) in the transverse direction and the elongation (B) in the longitudinal direction at an elongation speed of 300 mm/min at 25° C.

6. The method for selecting a material of an injection-molded article according to claim 1, wherein the complex modulus of the selected polyethylene is from 1.3 GPa to 1.80 GPa and the ratio (A/B) of the selected polyethylene is from 1.5 to 2.8.

7. The method for selecting a material of an injection-molded article according to claim 1, wherein the second specimen has an elongation (A) of 1.8 to 2.5 and elongation (B) of 1.25 to 1.45.

8. A method for manufacturing an injection-molded article using polyethylene as a raw material, the method comprising:
selecting a polyethylene having a complex modulus in a range of 1.3 GPa to 1.80 GPa, wherein the complex modulus of a first specimen of the polyethylene is measured in a form of a sheet having a width of 6 mm, a height of 10 mm and a thickness of 0.3 mm at 25° C., and having a ratio (A/B) of elongation (A) in a transverse direction and elongation (B) in a longitudinal direction of 1.5 to 2.8 wherein the ratio (A/B) of a second specimen of the polyethylene is measured in a form of a dog bone having a thickness of 3 mm, a width of 3 mm and an elongation part length of 13 mm, and
preparing the injection-molded article by injection molding.

9. The method for manufacturing an injection-molded article according to claim 8, wherein the injection molding is carried out at a resin temperature of 190° C. to 250° C., a mold temperature of 40° C. to 60° C. and a molding pressure of 0.6 MPa to 1.2 MPa.

10. The method for manufacturing an injection-molded article according to claim 8, wherein the first specimen is prepared by dissolving polyethylene pellets at 150° C. to 250° C. and subjecting the dissolved polyethylene pellets to a pressing process at a molding pressure of 20 to 25 MPa.

11. The method for manufacturing an injection-molded article according to claim 8, wherein the complex modulus is measured by applying a displacement of 0.1% at a frequency of 1 Hz in the longitudinal direction of the first specimen at 25° C.

12. The method for manufacturing an injection-molded article according to claim 8, wherein the second specimen is prepared by an injection molding method with a resin temperature of 190° C. to 250° C., a mold temperature of 40° C. to 60° C. and a molding pressure of 0.6 MPa to 1.2 MPa.

13. The method for manufacturing an injection-molded article according to claim 8, wherein the elongation (A) in the transverse direction and the elongation (B) in the longitudinal direction are measured at an elongation speed of 300 mm/min at 25° C.

14. The method for manufacturing an injection-molded article according to claim 8, wherein the polyethylene has elongation (A) in the transverse direction of 1.8 to 2.5 and elongation (B) in the longitudinal direction of 1.25 to 1.45.

15. The method for manufacturing an injection-molded article according to claim 8, wherein the injection-molded article is a crucible.

\* \* \* \* \*